United States Patent
Yonge-Mallo

(10) Patent No.: US 8,286,104 B1
(45) Date of Patent: Oct. 9, 2012

(54) INPUT METHOD APPLICATION FOR A TOUCH-SENSITIVE USER INTERFACE

(75) Inventor: Davinci Yonge-Mallo, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,545

(22) Filed: Oct. 6, 2011

(51) Int. Cl.
*G06F 3/033* (2006.01)

(52) U.S. Cl. ........ 715/863; 382/185; 382/186; 382/187; 382/189

(58) Field of Classification Search .................. 715/863; 345/168, 169, 173, 179; 382/185–187, 189, 382/209
See application file for complete search history.

(56) References Cited

U.S. PATENT DOCUMENTS

| | | | | |
|---|---|---|---|---|
| 5,805,167 | A * | 9/1998 | van Cruyningen | 715/808 |
| 2003/0184452 | A1 * | 10/2003 | Goodgoll | 341/23 |
| 2005/0195171 | A1 | 9/2005 | Aoki et al. | |
| 2006/0007190 | A1 * | 1/2006 | Pettiross et al. | 345/179 |
| 2007/0040813 | A1 * | 2/2007 | Kushler et al. | 345/173 |
| 2007/0156394 | A1 | 7/2007 | Banerjee et al. | |
| 2007/0174771 | A1 | 7/2007 | Mistry | |
| 2007/0277118 | A1 | 11/2007 | Kotipalli et al. | |
| 2007/0286663 | A1 * | 12/2007 | Kinney | 400/489 |
| 2008/0120541 | A1 | 5/2008 | Cheng | |
| 2009/0037837 | A1 | 2/2009 | Raghunath et al. | |
| 2011/0163973 | A1 * | 7/2011 | Ording et al. | 345/173 |
| 2011/0173575 | A1 * | 7/2011 | Karafiat | 715/863 |
| 2011/0205160 | A1 * | 8/2011 | Song et al. | 345/168 |
| 2011/0246927 | A1 * | 10/2011 | Im | 715/773 |
| 2011/0285656 | A1 * | 11/2011 | Yaksick et al. | 345/173 |

* cited by examiner

*Primary Examiner* — Ba Huynh
(74) *Attorney, Agent, or Firm* — Fish & Richardson P.C.

(57) ABSTRACT

In an aspect, a method includes the actions of displaying, at a touch-sensitive display, a plurality of characters that each represent a distinct consonant included in a language script; receiving, at the touch-sensitive display, a touch selection of a first character from the plurality of characters, the touch selection being received at a location on the touch-sensitive display at which the first character is displayed; and in response to receiving the touch selection: detecting a gesture input, selecting a vowel marker based at least in part on an association of the gesture input with one or more vowel markers; and displaying, at the touch-sensitive display, an updated representation of the first character based at least in part on the selected vowel marker. Other embodiments of this aspect include corresponding systems, apparatus, and computer programs, configured to perform the actions of the methods, encoded on computer storage devices.

29 Claims, 7 Drawing Sheets

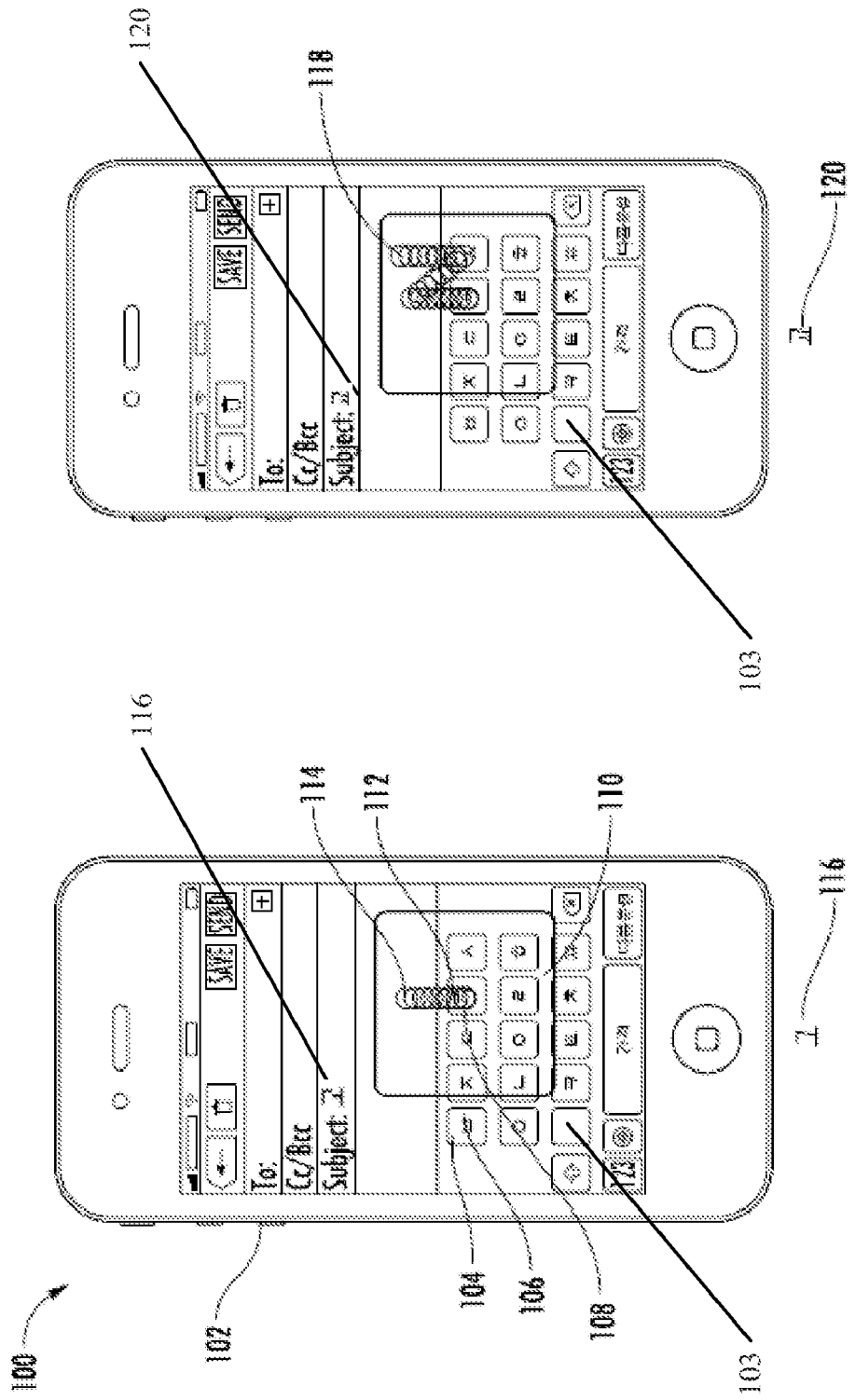

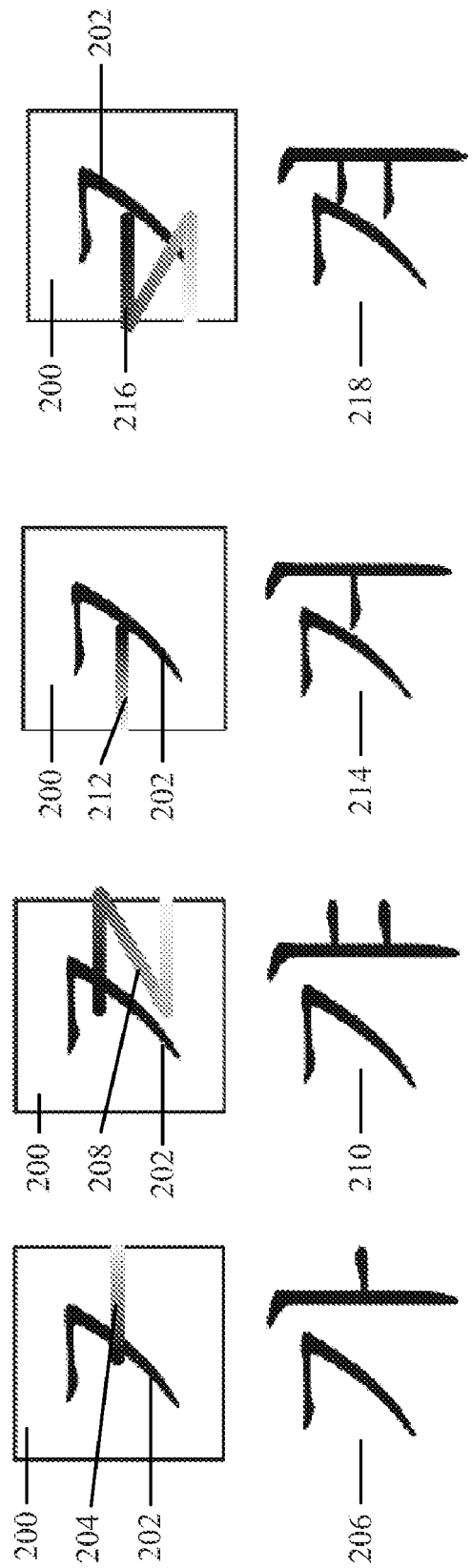

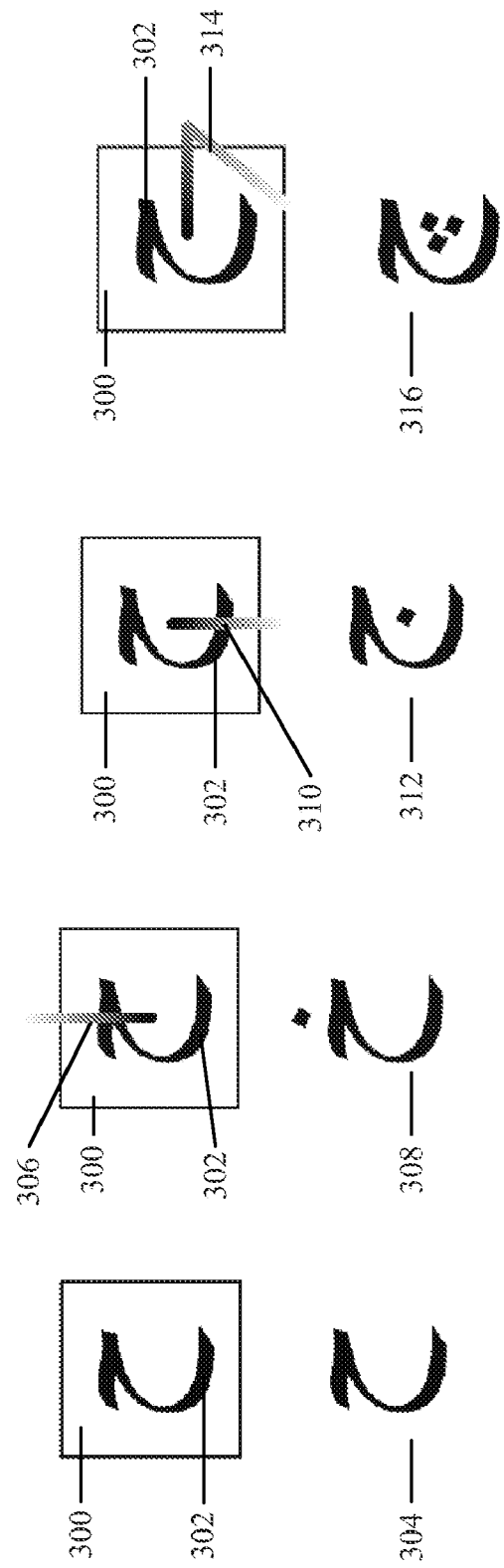

INPUT METHOD APPLICATION FOR A TOUCH-SENSITIVE USER INTERFACE

TECHNICAL FIELD

This document relates to touch-sensitive user interfaces.

BACKGROUND

English and other Latin-based scripts define text based on an aggregation of individual building blocks (letters. In such scripts, each letter can have a number of modified states (e.g., capitalized, modified by an accent, etc.). Device keyboards designed to enable text entry in such languages are generally suited to stateful input methods based on a one-to-one mapping between a key press and an output. Such keyboards are generally implemented on touchscreen devices as input method editors ("IMEs")—system components and/or programs that allow a user to enter input by interacting with a touch-based user interface that is output at a display device. For example, an on-screen/virtual, touch-based keyboard can substantially replicate the functionality of a physical keyboard (such as a typewriter keyboard). Other touchscreen IMEs are based on gesture input, in which an input gesture is mapped to a single output character. Such keyboards often have a static layout with keys divided into a first group of typing keys and a second group of state toggle keys. In such examples, the typing keys may each correspond to a single output character, while the state toggle keys (e.g., the "Caps Lock" key) can be configured to change the key layout and accordingly assign a different set of letters to the keyboard.

Because non-Latin-based languages often include more characters than can be included within the dimensions of a typical, physical QWERTY keyboard, an English-based computer keyboard is sometimes adapted to enable text input in such languages.

SUMMARY

This specification describes technologies relating to an input method editor for a touch-sensitive user interface.

One innovative aspect of the subject matter described in this document can be implemented as a method performed by data processing apparatus, the method including the actions of displaying, at a touch-sensitive display, a plurality of characters that each represent a distinct consonant included in a language script; receiving, at the touch-sensitive display, a touch selection of a first character from the plurality of characters, the touch selection being received at a location on the touch-sensitive display at which the first character is displayed; and in response to receiving the touch selection: detecting a gesture input, selecting a vowel marker based at least in part on an association of the gesture input with one or more vowel markers; and displaying, at the touch-sensitive display, an updated representation of the first character based at least in part on the selected vowel marker. Other embodiments of this aspect include corresponding systems, apparatus, and computer programs, configured to perform the actions of the methods, encoded on computer storage devices.

This, and other aspects, can include one or more of the following features. In response to detecting the gesture input, a selection of other characters displayed in the touch sensitive display can be precluded for the duration of the gesture input. It can be determined that the gesture input is dependent on the touch selection of the selected character while the touch selection is maintained during the gesture input. It can be determined that the gesture input is dependent on the touch selection of the selected character if the gesture input is detected within a predefined time after a cessation of the touch selection. In response to detecting the touch selection, a bounded region surrounding the selected character can be displayed in the touch-sensitive user interface. An image corresponding to the gesture input can be displayed within the bounded region. The association of gesture inputs with vowel markers can define association of gesture inputs with vowel markers for each consonant. The language script can be one selected from a group consisting of Korean, Arabic, and Hindi.

Another innovative aspect of the subject matter described in this document can be implemented as a method that includes the actions of displaying, at a touch-sensitive display, a plurality of characters that each represent a distinct consonant included in a language script; receiving, at the touch-sensitive display, a touch selection of a first character from the plurality of characters, the touch selection being received at a location on the touch-sensitive display at which the first character is displayed; detecting a gesture input that is dependent on the touch selection of the first character; selecting a vowel marker based at least in part on the association of the gesture input with one or more vowel markers; and displaying, at the touch-sensitive display, an updated representation of the first character based at least in part on the selected vowel marker. Other embodiments of this aspect include corresponding systems, apparatus, and computer programs, configured to perform the actions of the methods, encoded on computer storage devices.

Another innovative aspect of the subject matter described in this document can be implemented as a method that includes the actions of displaying, at a touch-sensitive display, a plurality of characters that each represent a distinct character included in a language script; detecting a touch selection of a first character displayed in the touch-sensitive display; in response to detecting the touch selection of the first character, designating the first character for association with subsequent inputs detected at the touch-sensitive display; detecting a gesture input at the touch-sensitive display, the gesture input representing an accent marker to be associated with the first character; in response to detecting the gesture input: identifying the accent marker represented by the gesture input, and displaying, in the touch-sensitive display, an output character representing a combination of the first character and the accent marker. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following potential advantages. The techniques described here can be implemented as an Input Method Editor (IME) that is contextual and adaptive, and which changes the user interface based on user input. In addition, the application that executes the techniques described here can predict an intended outcome by recognizing gesture inputs. The touch-sensitive user interface can serve as a viable alternative to keyboards for non-Latin languages that mimic the keyboards of Latin-based languages (for example, QWERTY keyboards). The user interface can be implemented as keyboard that is not crowded and that does not display characters in the display device that may be illegal according to rules of the language script. For example, for languages that have a phoneme structure of CVC (C is a consonant or is empty and V is a vowel or diphthong), an input of two initial consecutive vowels is illegal. The user interface described in this document can avoid a display of such illegal characters in the display device. More particularly, a system bandwidth that would otherwise be used to display such illegal characters can be re-purposed for legal input. In addition, using the user interface described in this document, a speed of user input can be increased and errors decreased as the characters in the user interface change in response to the context in a predictable fashion. Further, the adaptive system described in this document can provide feedback to a user, and hence serve as a teaching system or a tutorial or both.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-D illustrate an example mobile device.

FIGS. 2A-D illustrate portions of a touch-sensitive user interface receiving gesture inputs related to Korean characters.

FIGS. 3A-D illustrate portions of a touch-sensitive user interface receiving gesture inputs related to Arabic characters.

Like reference numbers and designations in the various drawings indicate like elements.

DETAILED DESCRIPTION

Figure 1B:
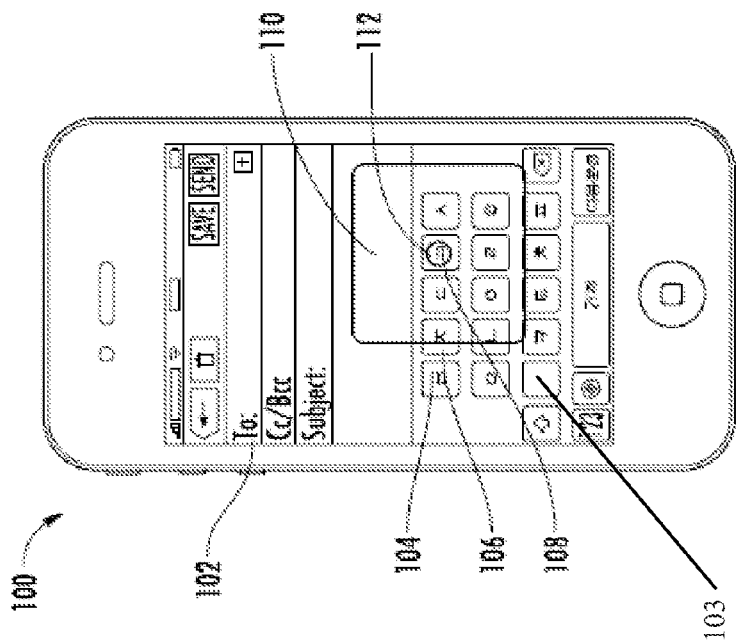

FIGS. 1A-D illustrate an example mobile device 100. Among other components, the mobile device 100 includes a touch-sensitive display 102 in which is rendered a touch-sensitive user interface 103. The mobile device 100 can include data processing apparatus that executes a computer application. The application can receive inputs from a user through the user interface 103 and can display outputs based on the inputs in the touch-sensitive display 102. The mobile device 100 can be, for example, a personal digital assistant (PDA), a smart phone, a navigation system, a music player, a tablet computer, an e-book reader, or other type of computing device that utilizes a touch-sensitive display. The other components of the mobile device 100 can include, for example, a hardware controller (to turn the device on/off), speakers, and the like.

As used by this document, a "touch-sensitive user interface" 103 (or "user interface," or "touchscreen," or "touch screen display") is an electronic visual display displayed on the touch sensitive display 102 and in conjunction with the display 102 detects the presence and location of a touch within the display area. Also, as used in this document, "a gesture input" is a form of motion input received by the user interface 103 and the display 102 that is interpreted by computer software instructions executed by the data processing apparatus. The touch, which defines a user input, can occur using a finger, hand, stylus, or other object. The touch can represent a single touch at a particular location on the touch-sensitive display 102, or the touch can represent a gesture input, e.g., a motion or "swipe," across multiple locations on the touch-sensitive display 102, or combinations of such motions or swipes. The user can control the application executing on the mobile device 100 through touches and gesture inputs.

The application can be, for example, an input method editing application that enables a user to input characters of a language script (for example, a non-English language script such as Korean, Arabic, Hindi). As described below, the user can provide touch and gesture inputs in the display 102, in response to which the application can display output characters in the touch-sensitive display 102.

In some implementations, the application, when executed, displays characters that each represents a respective consonant of a language script, in the touch-sensitive user interface 103. As shown in FIG. 1A, the application displays consonant characters of the Korean language including a first character 104 (ㅂ), a second character 106 (ㅈ) and a third character 108 (ㄱ). The application displays each character of the language script in a corresponding selectable object that a user can select by a touch selection. In some implementations, a touch selection is a prerequisite to a gesture input, and is a selection of a particular object displayed in the touch-sensitive display in response to a touch at a location on the touch-sensitive display at which the object is displayed. As will be described in more detail below, the gesture input is dependent on the touch selection.

The application can display the characters in one or more rows and columns. In addition to the characters, the application can display additional selectable objects representing for example, a space bar, a backspace key, a shift key, and one or more keys the selections of which will cause the application to display additional characters in the user interface 103 or in the display device 102 or both.

The application can receive a touch selection of one of the characters, for example, the third character 108 (ㄱ). For example, a user of the mobile device 100 can touch a location on the touch-sensitive display 102 at which the third character 108 (ㄱ) is displayed. In response to receiving the touch selection, the application can designate the character that was touched, i.e., the third character 108 (ㄱ), as a selected character. Designating the touched character as the selected character results in subsequent user inputs received through the touch-sensitive display 102 being associated with the selected character. For example, as described below, subsequent user inputs that are associated with vowel markers will be associated with the third character 108 (ㄱ).

In some implementations, the application can designate the character that was touched as a selected character by displaying a bounded region 110 surrounding the selected character in the touch-sensitive display 102. For example, the application can display a rectangular region surrounding the third character 108 (ㄱ), and, in certain instances, display the third character 108 (ㄱ) at the center of the rectangular region. For example, a color of the bounded region 110 can be different from the remainder of the display 102 and the user interface 103. Alternatively, or in addition, the bounded region 110 can have a translucent appearance.

In general, the application can display the bounded region 110 such that the region 110 is visually discernible from a remainder of the touch-sensitive display 102 and the touch-sensitive user interface 103. In the example shown in FIG. 1B, the bounded region 110 occupies less than an area occupied by the display 102 and the user interface 103. In some implementations, the application can display the bounded region 110 to occupy the entire area otherwise occupied by the display 102 and the user interface 103.

Figure 1A:
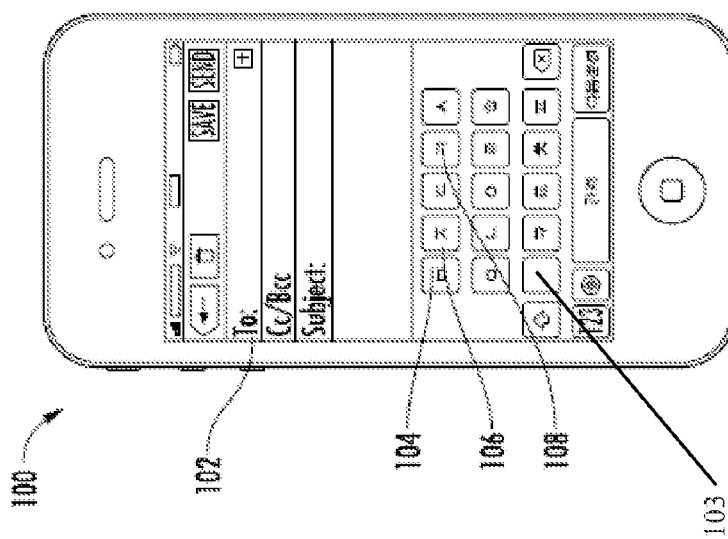

In some implementations, in addition to displaying the bounded region 110, the application can display the selected character, i.e., the third character 108 (ㄱ), in a visually discernible manner, either as originally rendered, as depicted in FIG. 1B, or in increased size (not shown). For example, the application can display a region 112 that is within the bounded region 110 and that surrounds the third character 108 (ㄱ) in a color that is different from a color of the remainder of the bounded region. Alternatively, or in addition, the application can display the third character 108 (ㄱ) in a color that is different from a color of the bounded region.

By displaying the bounded region 110, the application notifies the user that the touched character has been designated as the selected character, and that subsequent inputs that the user will provide through the touch-sensitive display 102 will be associated with the selected character. In other words, once the application designates the touched character as the designated (selected) character, the application precludes selection of other characters displayed in the display 102 for the duration of subsequent inputs associated with the touched character. In addition, the application can present the user with a bounded region 110 within which all or substantial portions of subsequent inputs (for example, gesture inputs) are to be provided.

In response to receiving the touch selection and designating the touched character as the designated character, the application monitors for a gesture input that is dependent on the touch selection of the selected character. As described above, a gesture input can be a motion input (for example, a swipe) received within the user interface 103. For example, the user can provide a gesture input using a finger by swiping the finger within the bounded region 110. Because the user first provides the touch selection and then provides the gesture input, the latter is dependent on the former.

In some implementations, the gesture input is dependent on the touch selection of the selected character while the touch selection is maintained during the gesture input. For example, if the application receives the touch selection of the third character 108 (ㄱ) and determines that the touch with the display 102 has been maintained after the touch selection, then the application associates any gesture input received for the duration that the touch is maintained is to be associated with the third character 108. In variations of these implementations, if the application detects a cessation of the touch (for example, because the user has removed his/her finger from the display 102), then the application will not associate a subsequent gesture input with the third character 108. To notify the user that a subsequent gesture input will not be associated with the third character 108, the application can cease to display the bounded region 110 in the user interface 103.

In alternative implementations, the gesture input is dependent on the touch selection of the selected character if the gesture input is detected during the touch or within a pre-defined time after the cessation of the touch selection or subsequent gesture input is detected and/or ceased. For example, the application can receive the touch selection of the third character 108 (ㄱ) and can determine a cessation of touch (for example, because the user has removed his/her finger from the display 102). Despite the cessation of touch, the application can associate a subsequently received gesture input with the third character 108 (ㄱ) as long as the gesture input is received within a pre-defined duration after the touch selection was received. This allows for gesture inputs that include multiple and separate gestures, e.g., a circular gesture input followed by a separate swipe across the circle. If no gesture input is received within the pre-defined duration, then a subsequent gesture input will not be associated with the selected character. The predefined duration can be, for example, 200 milliseconds, or some other duration.

When a subsequent gesture input is not associated with a selected character, for example, the application can treat the beginning of the subsequent gesture input as a new touch selection. To notify the user that a subsequent gesture input will not be associated with the third character 108 (ㄱ), the application can cease to display the bounded region 110 in the user interface 103.

In some implementations, the bounded region 110 is for notification only, and the gesture input is not required to be confined to the bounded region 110. For example, even though a bounded region is shown, the entire display 102 can be used to receive the gesture input.

In some implementations, the gesture input can be associated with vowel. In response to monitoring the gesture input, the application can access an association of gesture inputs with vowel markers. The gesture input can include touching different areas of the screen, can be continuous or discontinuous (i.e., be composed of multiple gestures contact with the touch surface is not continuous) or can be combinations of them. The association of gesture inputs and vowel markers can be stored, for example, as computer software instructions, in the mobile device 100. The associations can be defined by the software developer and stored in data associating the gesture inputs with vowel markers for each consonant, and particular gesture inputs can be selected to correspond with particular vowel markers.

For each consonant, each gesture input associated with each vowel marker for the consonant is different from each other gesture input associated with each other vowel marker for the consonant. However, a vowel marker for a first consonant and a vowel marker for a second consonant can be associated with a same gesture input. For example, a gesture input of a "u" shape can be associated with a first vowel marker, a gesture input of a "z" shape can be associated with a second vowel marker, and so on. Additionally, for a first consonant, a gesture input of a "u" shape can be associated with a particular vowel marker, and for a second, different consonant, the gesture input of the "u" shape can be associated with the same particular vowel marker. Finally, a gesture input can also be associated with different markers for different consonants. For example, for a first consonant, a gesture input of a "u" shape can be associated with a first vowel marker, and for a second, different consonant, the gesture input of the "u" shape can be associated with a second, different vowel marker. The associations can be stored, for example, in a look-up table that receives data indicating the selected character and gesture input as input.

Upon accessing the associations, the application can select a vowel marker that is associated with the gesture input that is detected, and select a vowel marker. In addition, the application can display a representation of the selected character as modified by the vowel marker in the user interface 103.

For example, the gesture input shown in FIG. 1C is associated with the Korean vowel, ㅗ, which modifies the third character 108 (ㄱ) resulting in the character 116. Thus, the third character 108 (ㄱ) represents a base character and the vowel, ㅗ, represents a modifier that modifies the base character to result in an output character, for example, the character 116 shown in FIG. 1C. The application displays the character 116 in the display 102 or in the user interface 103. As shown in FIG. 1C, as the user provides the gesture input (i.e., swipes the finger), the application can display an image 114 that corresponds to the gesture input in the display 102, for example, within the bounded region 110. For example, the gesture input includes a touch selection of any location within the bounded region followed by a swipe in a vertically upward direction and then by a cessation of the gesture input (for example, a removal of the finger from the display 102). In response to the gesture input, the application displays the image 114 as a vertical line that tracks the swipe, i.e., originating from the location of the touch selection, extending in the direction of the swipe, and terminating at the location at which the gesture input ceased.

FIG. 1D shows another example in which the gesture input is associated with the Korean vowel, ㅛ, which modified the third character 108 (ㄱ) resulting in the character 120 shown in FIG. 1D, which the application displays in the display 102 or in the user interface 103.

The representation can be generated based on the rules of the language script of the characters. For example, the rules of the language script can define a representation of a consonant represented by the selected character and the vowel marker received through the gesture input. In particular, the rules can define associations of vowel markers for each consonant. The rules can also be stored, for example, as computer software instructions in the mobile device 100. The application can execute the rules to determine the representation of the selected character as modified by the vowel marker, and to display the representation in the user interface 103. The language script can be one in which vowels modify the consonants to which the vowels are attached. For example, the language script can be any non-Latin language script, and, in particular, can be selected from a group consisting of Korean, Arabic, and Hindi.

In some implementations, the application can display the image 114 to be visually discernible from the bounded region 110. For example, the application can display the image 114 in a color that is different from that of the bounded region. In addition, the application can display the color as a tapered gradient in a direction of the gesture input. For example, the color of the vertical line shown in FIG. 1C can be most intense at a location of the touch selection, can be relatively less intense at a location at which the finger swipe ceased, and can have a tapered gradient of color in between. In general, a gradient of color of the image 114 from most intense to least intense can represent a direction of the gesture input.

FIGS. 2A-D illustrate portions of a touch-sensitive user interface 200 receiving gesture inputs related to Korean characters. The Korean (Hangul) alphabet is written in syllabic blocks that include letters (jamo). Each block includes at least one consonant and at least one vowel. The application can display the fourteen simple consonants as base characters in the touch-sensitive user interface. Five of these consonants can be doubled to form the five doubled (or tense) consonants by receiving touch selections, for example, by taping. In Hangul, each vowel is written as a vertical or horizontal main stroke with zero, one, or two smaller strokes written perpendicularly to the main stroke. In the application, the characters that represent consonants are modified by gesture inputs that resemble the smaller strokes. The gesture inputs disambiguate the direction of the main stroke.

For example, the gesture input represented by the image 204 represents the vowel marker, ㅏ, that modifies the character 202 (ㄱ) resulting in character 206. Similarly, the gesture input represented by the image 208 represents the vowel marker, ㅑ, that modifies the character 202 (ㄱ) resulting in character 210. In addition, the gesture input represented by the image 212 represents the vowel marker, ㅓ, that modifies the character 202 (ㄱ) resulting in character 214. Also, the gesture input represented by the image 212 represents the vowel marker, ㅕ, that modifies the character 202 (ㄱ) resulting in character 218.

FIGS. 3A-D illustrate portions of a touch-sensitive user interface 300 receiving gesture inputs related to Arabic characters. In the Perso-Arabic script, letters can be grouped by shape, such that letters within each group are distinguished from one another by diacritical marks or "dots." The base characters are then the shape-groups, and individual characters can be formed by using a gesture input which begins with the base character corresponding to the group. The characters shown in FIGS. 3A-D belong to the he-jimi group, which consists of four letters distinguished by corresponding dots. Using the application, each character can be entered by making a gesture beginning on the he-jimi character that corresponds to the location and number of the dots. Selecting the he-jimi character, which itself has no dots, without further without additional gesturing can designate the he-jimi group as the selected characters.

For example, the application displays the character 302 (ح) in the user interface 300. In the absence of any gesture input, the character 302 (ح) represents the base character 304 (ح). The gesture input represented by the image 306 represents vowel marker consisting of one diacritic dot, that modifies the character 302 (ح) resulting in character 308 (ج). Similarly, the gesture input represented by the image 310 represents another diacritic dot, that modifies the character 302 (ح) resulting in character 308 (خ). In addition, the gesture input represented by the image 314 represents three diacritic dots, that modifies the character 302 (ح) resulting in character 316 (ڿ).

Examples of gesture inputs and associations with vowel markers have been described with respect to Korean and Perso-Arabic scripts. However, the same principals can be applied to other languages and scripts, such as Non-Latin scripts, for example, Indic scripts.

Figure 4:
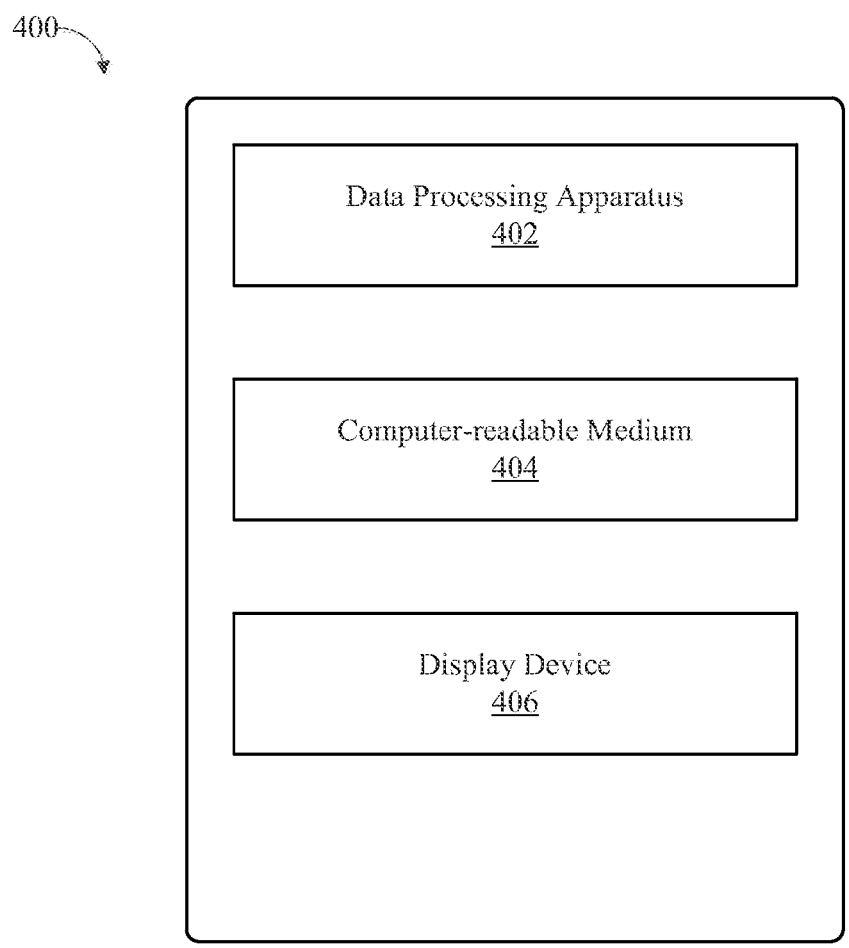
FIG. 4 illustrates an example of a system implementing the application for a touch-sensitive user interface.

FIG. 4 illustrates an example of a system 400 implementing the application for a touch-sensitive user interface. The system 400 can include data processing apparatus 402, a computer-readable medium 404, and a display device 406. The computer-readable medium 404 can store computer software instructions executable by the data processing apparatus 402 to cause the application described above in the display device 406. The example system 400 can be implemented on a mobile device, as described above. Alternatively, the system can be implemented in any computer, for example, a desktop computer, a laptop computer, and the like. For example, in a desktop computer, the data processing apparatus and the computer-readable medium can be implemented in a central processing unit that is separate and distinct from a display device. The display device can be a cathode ray tube (CRT) or liquid crystal display (LCD) monitor that includes a touch-sensitive user interface. Examples of processes implemented by the system 400 are described with reference to FIGS. 5 and 6.

Figure 5:
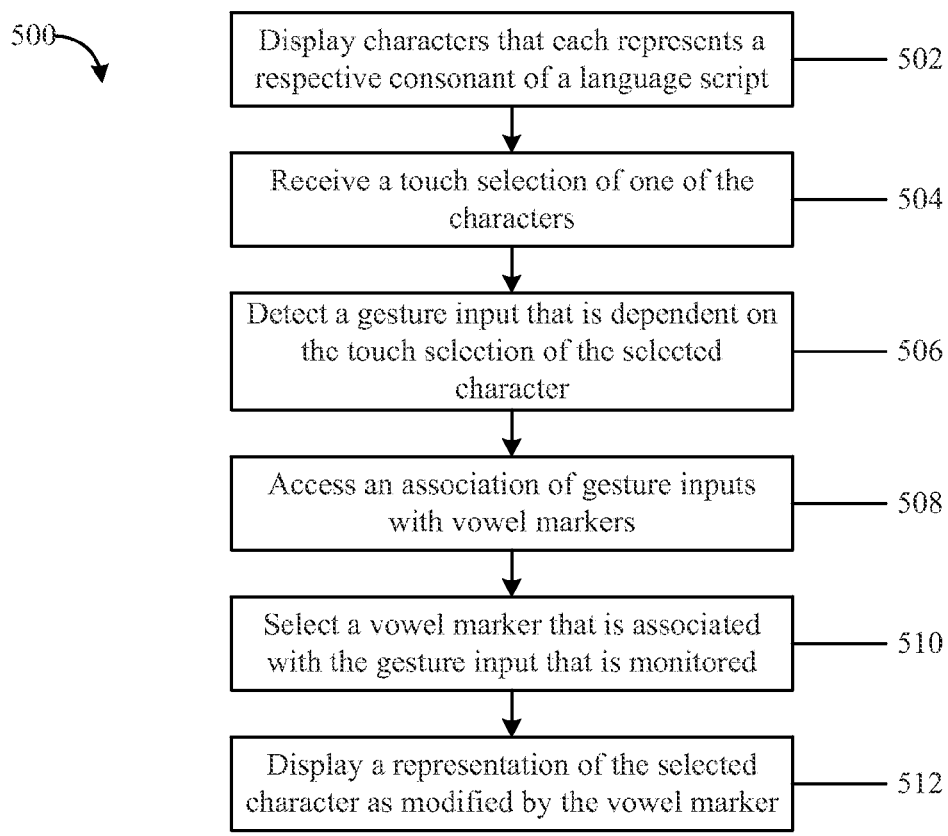
FIG. 5 is a flowchart showing an example of a process for displaying characters of a language script.

FIG. 5 is a flowchart showing an example of a process 500 for displaying characters of a language script. The process 500 displays characters that each represents a respective consonant of a language script at 502. The process 500 receives a touch selection of one of the characters at 504. The process 500 detects a gesture input that is dependent on the touch selection of the selected character at 506. The process 500 accesses an association of gesture inputs with vowel markers at 508. The process 500 selects a vowel marker that is associated with the gesture input that is monitored at 510. The process 500 displays a representation of the character as modified by the vowel marker at 512.

Figure 6:
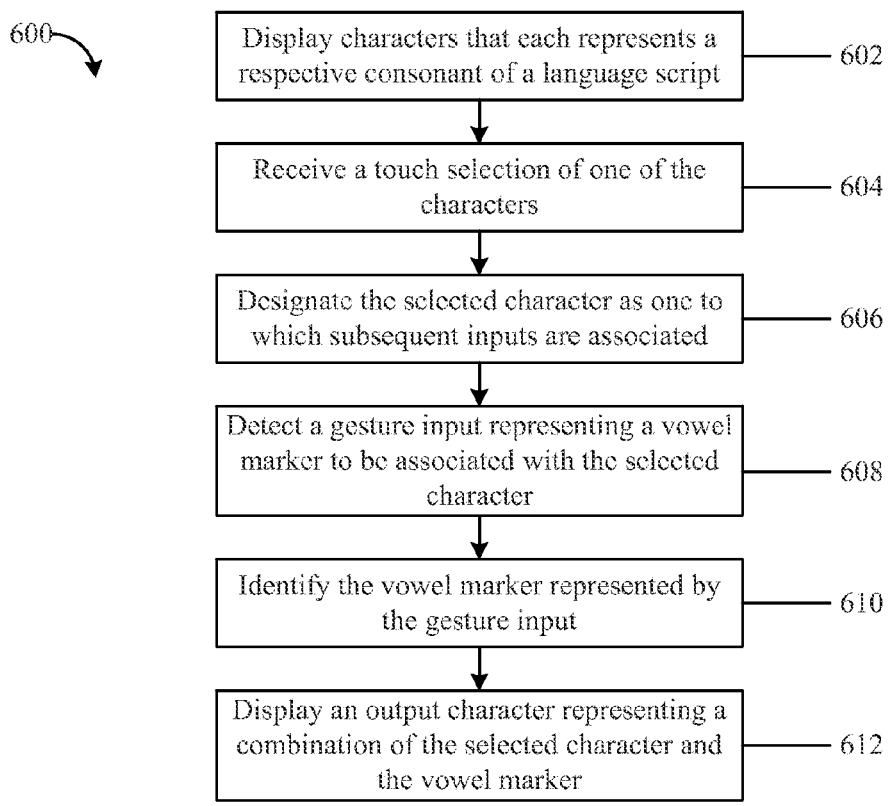
FIG. 6 is a flowchart showing an example of a process for displaying characters of a language script.

FIG. 6 is a flowchart showing an example of a process 600 for displaying characters of a language script. The process 600 displays characters that each represents a respective consonant of a language script 602. The process 600 receives a touch selection of one of the characters at 604. The process 600 designates the selected character as one to which subsequent inputs are associated at 606. The process 600 detects a gesture input representing a vowel marker to be associated with the selected character at 608. The process 600 identifies the vowel marker represented by the gesture input at 610. The process 600 displays an output character representing a combination of the selected character and the vowel marker at 612.

Although the examples above are described with reference to consonants and vowel markers, the processes can be applied to associations of characters and accent markers, and are not necessarily limited to consonants and vowel markers.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user. All or portions of the display device can include a touch screen or any touch-sensitive user interface. The computer can also include a keyboard and a pointing device, for example, a mouse or a trackball or touch pad, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The gesture inputs described above are exemplary gesture inputs. As alternatives or in addition to the gesture inputs described above and illustrated in the figures, other gesture inputs can be associated with vowel markers. In some implementations, instead of a touch selection, a first gesture input can be associated with a character that represents a consonant and a second subsequent gesture input can be associated with a vowel marker to be associated with the character. In some implementations, instead of or in addition to gesture inputs, touch selections and/or selections of hardware components of the mobile device can be associated with the vowel markers. Similarly, instead of touch selections, selections of hardware components on the mobile device can be associated with the characters that represent the consonants.

What is claimed is:

1. A method, comprising:
   displaying, at a touch-sensitive display, a plurality of characters in a corresponding plurality of selectable objects, wherein each character represents a distinct consonant included in a language script;
   receiving, at the touch-sensitive display, a touch selection of a first selectable object displaying a first character from the plurality of selectable objects, the touch selection being received at a location on the touch-sensitive display at which the first selectable object is displayed; and
   in response to receiving the touch selection:
      subsequent to the selection of the first selectable object, precluding selection of each of the other selectable objects from the plurality of selectable objects that display other characters from the plurality of characters displayed in the touch sensitive display during a gesture input that is dependent on the touch selection;
      detecting the gesture input within a region of the touch sensitive display that displayed the first selectable object and at least one other selectable object from the plurality of selectable objects;
      selecting a vowel marker based at least in part on an association of the gesture input with one or more vowel markers; and
      displaying, at the touch-sensitive display, an updated representation of the first character based at least in part on the selected vowel marker.

2. The method of claim 1, further comprising determining that the gesture input is dependent on the touch selection of the first selectable object while the touch selection is maintained during the gesture input.

3. The method of claim 1, further comprising determining that the gesture input is dependent on the touch selection of the first selectable object when the gesture input is detected within a predefined time after a cessation of the touch selection.

4. The method of claim 1, further comprising, in response to receiving the touch selection:
   displaying a bounded region surrounding the first selectable object in the touch-sensitive display; and
   displaying an image within the bounded region, the image corresponding to a path the gesture input.

5. The method of claim 1, wherein selecting a vowel marker based at least in part on an association of the gesture input with one or more vowel markers comprises:
   accessing data associating gesture inputs with vowel markers for each consonant, wherein:
      for each consonant, each gesture input associated with each vowel marker for the consonant is different from each other gesture input associated with each other vowel marker for the consonant; and
      at least one vowel marker for a first consonant and at least one vowel marker for a second consonant are associated with a same gesture input.

6. The method of claim 1, wherein the language script is one selected from a group consisting of Korean, Arabic, and Hindi.

7. The method of claim 1, further comprising:
   determining that the gesture input is dependent on the touch selection of the first selectable object when the gesture input is detected during the touch selection or within a predefined time after a cessation of the touch selection;
   in response to receiving the touch selection, displaying a bounded region surrounding the first selectable object in the touch-sensitive display; and
   displaying an image within the bounded region, the image corresponding to a path of the gesture input.

8. The method of claim 7, wherein selecting a vowel marker based at least in part on the an association of the gesture inputs with the one or more vowel markers comprises:
   accessing data associating gesture inputs with vowel markers for each consonant, wherein:
      for each consonant, each gesture input associated with each vowel marker for the consonant is different from each other gesture input associated with each other vowel marker for the consonant; and at least one vowel marker for a first consonant and at least one vowel marker for a second consonant are associated with a same gesture input.

9. The method of claim 1, further comprising continuing to display the first selectable object and the at least one other selectable object during the gesture input.

10. A non-transitory computer-readable medium storing computer software instructions executable by data processing apparatus to perform operations comprising:
 displaying, at a touch-sensitive display, a plurality of characters in a corresponding plurality of selectable objects, wherein each character represents a distinct consonant included in a language script;
 receiving, at the touch-sensitive display, a touch selection of a first selectable object displaying a first character from the plurality of selectable objects, the touch selection being received at a location on the touch-sensitive display at which the first selectable object is displayed;
 in response to receiving the touch selection of the first character:
  subsequent to the selection of the first selectable object, precluding selection of each of the other selectable objects from the plurality of selectable objects that display other characters from the plurality of characters displayed in the touch sensitive display during a gesture input that is dependent on the touch selection;
  detecting the gesture input within a region of the touch sensitive display that displayed the first selectable object and at least one other selectable object from the plurality of selectable objects;
  selecting a vowel marker based at least in part on an association of the gesture input with one or more vowel markers; and
  displaying, at the touch-sensitive display, an updated representation of the first character based at least in part on the selected vowel marker.

11. The medium of claim 10, the operations further comprising determining that the gesture input is dependent on the touch selection of the first selectable object while the touch selection is maintained during the gesture input.

12. The medium of claim 10, the operations further comprising determining that the gesture input is dependent on the touch selection of the first selectable object when the gesture input is detected within a predefined time after a cessation of the touch selection.

13. The medium of claim 10, the operations further comprising, in response to receiving the touch selection:
 displaying a bounded region surrounding the first selectable object in the touch-sensitive display; and
 displaying an image within the bounded region, the image corresponding to a path the gesture input.

14. The medium of claim 10, wherein selecting a vowel marker based at least in part on an association of the gesture input with one or more vowel markers comprises:
 accessing data associating gesture inputs with vowel markers for each consonant, wherein:
  for each consonant, each gesture input associated with each vowel marker for the consonant is different from each other gesture input associated with each other vowel marker for the consonant; and
  at least one vowel marker for a first consonant and at least one vowel marker for a second consonant are associated with a same gesture input.

15. The medium of claim 10, wherein the language script is one selected from a group consisting of Korean, Arabic, and Hindi.

16. The medium of claim 10, the operations further comprising:
 determining that the gesture input is dependent on the touch selection of the first selectable object when the gesture input is detected during the touch selection or within a predefined time after a cessation of the touch selection;
 in response to detecting the touch selection, displaying a bounded region surrounding the first selectable object in the touch-sensitive display; and
 displaying an image within the bounded region, the image corresponding to a path of the gesture input.

17. The medium of claim 16, wherein selecting a vowel marker based at least in part on an association of the gesture input with one or more vowel markers comprises:
 accessing data associating gesture inputs with vowel markers for each consonant, wherein:
  for each consonant, each gesture input associated with each vowel marker for the consonant is different from each other gesture input associated with each other vowel marker for the consonant; and
  at least one vowel marker for a first consonant and at least one vowel marker for a second consonant are associated with a same gesture input.

18. The medium of claim 10, the operations further comprising continuing to display the first selectable object and the at least one other selectable object during the gesture input.

19. A system comprising:
 data processing apparatus; and
 a computer-readable medium storing computer software instructions executable by the data processing apparatus to perform operations comprising:
  displaying, at a touch-sensitive display, a plurality of characters in a corresponding plurality of selectable objects, wherein each character represents a distinct consonant included in a language script;
  receiving, at the touch-sensitive display, a touch selection of a first selectable object displaying a first character from the plurality of selectable objects, the touch selection being received at a location on the touch-sensitive display at which the first selectable object is displayed;
  in response to receiving the touch selection of the first character:
   subsequent to the selection of the first selectable object, precluding selection of each of the other selectable objects from the plurality of selectable objects that display other characters from the plurality of characters displayed in the touch sensitive display during a gesture input that is dependent on the touch selection;
   detecting the gesture input within a region of the touch sensitive display that displayed the first selectable object and at least one other selectable object from the plurality of selectable objects;
   selecting a vowel marker based at least in part on an association of the gesture input with one or more vowel markers; and
   displaying, at the touch-sensitive display, an updated representation of the first character based at least in part on the selected vowel marker.

20. The system of claim 19, the operations further comprising determining that the gesture input is dependent on the touch selection of the first selectable object while the touch selection is maintained during the gesture input.

21. The system of claim 19, the operations further comprising determining that the gesture input is dependent on the touch selection of the first selectable object when the gesture input is detected within a predefined time after a cessation of the touch selection.

22. The system of claim 19, the operations further comprising, in response to receiving the touch selection:
   displaying a bounded region surrounding the first selectable object in the touch-sensitive display; and
   displaying an image within the bounded region, the image corresponding to a path the gesture input.

23. The system of claim 19, wherein selecting a vowel marker based at least in part on an association of the gesture input with one or more vowel markers comprises:
   accessing data associating gesture inputs with vowel markers for each consonant, wherein:
      for each consonant, each gesture input associated with each vowel marker for the consonant is different from each other gesture input associated with each other vowel marker for the consonant; and
      at least one vowel marker for a first consonant and at least one vowel marker for a second consonant are associated with a same gesture input.

24. The system of claim 19, wherein the language script is one selected from a group consisting of Korean, Arabic, and Hindi.

25. The system of claim 19, the operations further comprising:
   determining that the gesture input is dependent on the touch selection of the first selectable object while the touch selection is maintained during the gesture input;
   in response to detecting the touch selection, displaying a bounded region surrounding the first selectable object in the touch-sensitive display; and
   displaying an image within the bounded region, the image corresponding to a path of the gesture input.

26. The system of claim 25, wherein selecting a vowel marker based at least in part on an association of the gesture input with one or more vowel markers comprises:
   accessing data associating gesture inputs with vowel markers for each consonant, wherein:
      for each consonant, each gesture input associated with each vowel marker for the consonant is different from each other gesture input associated with each other vowel marker for the consonant; and
      at least one vowel marker for a first consonant and at least one vowel marker for a second consonant are associated with a same gesture input.

27. A non-transitory computer-readable medium storing computer software instructions executable by data processing apparatus to perform operations comprising:
   displaying, at a touch-sensitive display, a plurality of characters in a corresponding plurality of selectable objects, wherein each character represents a distinct consonant included in a language script;
   detecting a touch selection of a first selectable object displaying a first character displayed in the touch-sensitive display;
   in response to detecting the touch selection of the first selectable object:
      designating the first selectable object for association with subsequent inputs detected at the touch-sensitive display;
      precluding selection of each of the other selectable objects from the plurality of selectable objects that display the other characters from the plurality of characters displayed in the touch sensitive display during a gesture input that is dependent on the touch selection;
      detecting, within a region of the touch sensitive display that displayed the first selectable object and at least one other selectable object from the plurality of selectable objects, the gesture input at the touch-sensitive display, the gesture input representing an accent marker to be associated with the first character;
   in response to detecting the gesture input:
      identifying the accent marker represented by the gesture input, and
      displaying, in the touch-sensitive display, an output character representing a combination of the first character and the accent marker.

28. The medium of claim 27, the operations further comprising:
   detecting the gesture input comprises determining that the gesture input is dependent on the touch selection of the first selectable object while the touch selection is maintained during the gesture input;
   in response to detecting the touch selection, displaying a bounded region surrounding the first selectable object in the touch-sensitive display; and
   displaying an image within the bounded region, the image corresponding to a path gesture input.

29. The medium of claim 27, wherein each distinct character is a consonant, and each accent marker is a vowel marker, and identifying the accent marker represented by the gesture input comprises accessing data associating gesture inputs with vowel markers for each consonant, wherein:
   for each consonant, each gesture input associated with each vowel marker for the consonant is different from each other gesture input associated with each other vowel marker for the consonant; and
   at least one vowel marker for a first consonant and at least one vowel marker for a second consonant are associated with a same gesture input.

* * * * *

UNITED STATES PATENT AND TRADEMARK OFFICE
CERTIFICATE OF CORRECTION

PATENT NO. : 8,286,104 B1
APPLICATION NO. : 13/267545
DATED : October 9, 2012
INVENTOR(S) : Davinci Yonge-Mallo It is certified that error appears in the above-identified patent and that said Letters Patent is hereby corrected as shown below:

In the Claims:

At Column 12, in Claim 8, Line 60, after "on" delete "the"

Signed and Sealed this
Fifth Day of March, 2013

Teresa Stanek Rea
*Acting Director of the United States Patent and Trademark Office*